United States Patent Office 3,483,257
Patented Dec. 9, 1969

3,483,257
CONJUGATED ACETYLENIC KETONES AND
METHOD FOR PREPARATION OF SAME
AND USE OF SAME
Roland Chretien, Paris, and Georges Wetroff, Le Thillay,
France, assignors to Produits Chimiques Pechiney-
Saint-Gobain, Neuilly-sur-Seine, France
No Drawing. Filed Mar. 16, 1966, Ser. No. 534,659
Claims priority, application France, Mar. 18, 1965,
9,753
Int. Cl. C07c 49/76, 103/22; A61k 27/00
U.S. Cl. 260—592                                       1 Claim

ABSTRACT OF THE DISCLOSURE

A conjugated acetylenic ketone having the formula

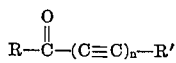

in which R is an aromatic nucleus, $n$ is a whole number within the range of 3 to 5, and R' represents an alkyl group, and in which the compounds of this invention show marked parasiticidal and bactericidal activity.

---

This invention relates to chemical compounds identified as conjugated acetylenic ketones having at least three acetylenic bonds and to a process for preparation of same and to the use of same as a parasiticide.

The anti-fungal activity of phenyl-1 hexadiyne-2,4 one-1 is known; however, the compound has very little activity, especially towards such organisms as *Aspergillus niger*. In order to obtain a desirable effect, it is necessary to make use of the compound in rather high concentrations.

On the other hand, the conjugated acetylenic ketones of this invention exhibit a marked efficiency in their ability to inhibit growth of various parasitic organisms, even when used in relatively low concentrations.

The compounds of this invention can be defined as conjugated acetylenic ketones having at least three acetylenic bonds and having the general formula

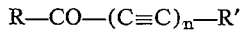

in which R represents an organic group including an alkyl, such as methyl, ethyl, propyl, butyl, isobutyl and the like; an aralkyl, such as benzyl, and alkaryl, tolyl, xylyl and the like; a cycloalkyl radical or at least an aromatic or heterocyclic nucleus or residue which may be unsubstituted or substituted by one or more groups including an alkyl, such as methyl, ethyl, propyl, butyl and the like; acyl, such as acetyl, propionyl, ethanolyl, isobutyryl and the like; halogeno, such as chloro, bromo, iodo and the like; trihalogenomethyl; hydroxyl; alkoxyl, such as methoxyl, ethoxyl and the like; dialkylamino such as dimethylamino, diethylamino, methyl ethylamino and the like; dialkylamido, such as diethylamido, dipropylamido, methylethylamido, and the like, in which $n$ is a whole number of 3 or more which is limited in practice by the stability of the particular acetylenic ketone and which preferably is a number within the range of 3 to 5; and in which R' is either a hydrogen atom, a halogen atom, or a radical such as alkyl, aralkyl, cycloalkyl, acyl, aryl or an aromatic or heterocyclic nucleus or residue which may be unsubstituted or substituted in the manner set forth with reference to the R group previously defined.

It has been found that when at least three acetylenic bonds are present in the molecule, the latter exhibits a high degree of parasitic activity.

The preparation of the conjugated acetylenic ketones of this invention can be carried out by the oxidation of the corresponding alcohols, as by means of any conventional oxidizing agents such as chromic anhydride or active manganese dioxide.

The corresponding alcohols can be obtained by various methods such as (a) by action of the corresponding aldehydes with the lithium or sodium derivatives of true acetylenics in liquid ammonia or other convenient solvent, (b) by action of the aldehydes on the magnesium derivatives of true acetylenics or (c) by the action of the 1-bromo acetylenics with the true acetylenics according to the reaction of Cadiot and Chodkiewicz.

The conjugated acetylenic ketones of this invention, and particularly phenyl-1-octatriyne-2,4,6 one-1, are active in the inhibition of growth of bacteria and/or destroying bacteria particularly such bacteria as *Corynebacterium diphtheriae*, *Staphylococcus aureus*, *Streptococcus pyogenes*, *Escherichia coli*, *Streptomyces griseus*, and *Bacillus megaterium* KM.

It has been found that the compounds of this invention also have noticeable anti-fungal activity, especially with regard to *Aspergillus niger*.

The conjugated acetylenic ketones of this invention can be employed alone or in admixture with known microbicides. They can be applied from a solvent system such as in acetone, benzene, chlorobenzene, chloroform and the like, or they can be applied in a pure state or in admixture with inert carriers such as talcum, silica, kaolin and the like, for application as a powder. Instead, the compounds can be formulated into a paste or a pomade for application.

The following examples are given by way of illustration, but not by way of limitation, of the practice of this invention:

EXAMPLE 1

Preparation of phenyl-1 octatriyne-2,4,6 one-1

10 g. of bromo-1 pentadiyne-1,3, dissolved in 15 ml. of methane, are added slowly with agitation to a flask cooled in a salt-ice bath and containing 9.25 g. of phenyl-1 propyne-2 ol-1, 19.5 ml. of a 33% ethylamine solution in methanol, .15 g. of cuprous chloride and .7 g. of hydroxylamine chlorohydrate.

The mixture is maintained for two hours at a temperature within the range of 0–5° C. and then allowed to return to room temperature. 100 ml. of water and 1 g. of potassium cyanide are added and the contents of the flask are poured into 900 ml. of water. The product is extracted with ether and the ether solution is washed with 10% hydrochloric acid and then with water, and then alternately with a solution of sodium bicarbonate and water until neutrality is achieved.

After drying and removal of the ether by distillation, the product is re-crystallized from petroleum ether to yield 6 g. of phenyl-1 octatriyne-2,4,6 ol-1, having a melting point of 82° C., corresponding to a yield of 44% by weight of theory.

The 6 g. of phenyl-1 octatriyne-2,4,6 ol-1 in solution in 50 ml. of acetone are progressively added to 60 g. of active $MnO_2$ in suspension in 600 ml. of acetone. The composition is agitated for 8 hours, filtered, dried, and the solvent is eliminated by distillation or evaporation. After re-crystallization in hexane, 2.95 g. of phenyl-1 octatriyne-2,4,6 one-1, having a melting point of 79° C., are obtained, corresponding to a yield of 49% by weight of theory.

EXAMPLE 2

The bacterial activity of the phenyl-1 octariyne-2,4,6 one-1 has been illustrated by the following: A solution containing 10 ml. of the compound per ml. of acetone is added to dishes containing a gelose medium based upon heart and brain extracts (Infusion "Brain Heart" of Difco)

in which the compound is added in amounts of 100, 50, 25, 12.5 and 6.25 micrograms per ml. of medium.

The dishes are implanted with several different microorganisms. After 24 hours and 48 hours of incubation at 37° C., determination is made of the minimum concentration of the compound that will completely inhibit the development of the stocks of implanted bacteria. Similar culture tests were carried out with controls of the same gelose medium alone and containing only acetone. The following are the results that were obtained:

| Bacteria | Phenyl-1 octatriyne-2,4,6 one-1 minimal concentrations in µg./ml. | |
| --- | --- | --- |
| | After 24 hrs. | After 48 hrs. |
| Corynebacterium diphtheriae | 12.5 | 50 |
| Staphylococcus aureus | 25 | 50 |
| Streptococcus pyogenes | 25 | 50 |
| Escherichia coli | 50 | 50 |
| Streptomyces griseus | 25 | 50 |
| Bacillus megaterium KM | 25 | 50 |

EXAMPLE 3

The anti-fungal activity of phenyl-1 octatriyne-2,4,6 one-1 has also been demonstrated on *Aspergillus niger* as follows:

A culture medium was formulated of an aqueous solution containing 40 g./l. of malt extract and 0.5 g./l. of mycologic peptone. This was distributed in a number of test tubes having 10 ml. capacity. The tubes were sterilized in any autoclave at 120° C. for 15 minutes. An aqueous suspension of 1% phenyl-1 octatriyne-2,4,6 one-1 was added to each tube in an amount to provide one part by weight of the compound to 1,000 to 100,000 parts by weight of the culture medium.

The tubes were implanted with approximately equal quantities of mycelium taken from stock culture. They were then put in a drying oven at 28–30° C. and were examined after 10 days of incubation at this temperature. A control was also included in the form of tubes containing only the culture medium. To better illustrate the improvements obtained with the compounds of this invention, a further comparison test was included with the compound phenyl-1 hexadiyne-2,4 one-1.

The minimum concentration of phenyl-1 octatriyne-2,4,6 one-1 to completely inhibit the growth of *Aspergillus niger* after 10 days of incubation at 28° C. was one part per 25,000 whereas a concentration of one part per 12,500 was required for the phenyl-1 hexadiyne-2,4 one-1. From this it can be concluded that the activity of phenyl-1 octatriyne-2,4,6 one-1 is at least twice as great as that of phenyl-1 hexadiyne-2,4 one-1.

It will be apparent from the foregoing that a new and improved series of chemical compounds are provided which have new and novel bactericidal activity and which enable use as a parasiticide.

It will be understood that changes may be made in the details of preparation, formulation and application without departing from the spirit of the invention, especially as defined in the following claim.

We claim:
1. A conjugated acetylenic ketone phenyl-1 octatriyne-2,4,6 one-1.

References Cited

Tanaka et al.: Antibiotics and Chemotherapy 9, 151–155 (1959).

Iwai et al.: Chemical Abstracts 5217200e (1958).

DANIEL D. HORWITZ, Primary Examiner

U.S. Cl. X.R.

260—558, 576, 577, 586, 590, 593, 596; 424—324, 330, 331